United States Patent [19]

Giner

[11] 3,739,573

[45] June 19, 1973

[54] DEVICE FOR CONVERTING ELECTRICAL ENERGY TO MECHANICAL ENERGY

[75] Inventor: Jose Giner, Sudbury, Mass.

[73] Assignee: Tyco Laboratories, Inc., Waltham, Mass.

[22] Filed: Oct. 20, 1970

[21] Appl. No.: 82,440

[52] U.S. Cl. .................. 60/37, 136/86 R, 417/394
[51] Int. Cl. ............................................. F01k 25/08
[58] Field of Search .................... 136/86; 417/394; 60/23, 37

[56] References Cited
UNITED STATES PATENTS

| | | | |
|---|---|---|---|
| 1,182,759 | 5/1916 | Emanuel | 136/86 R |
| 3,220,937 | 11/1965 | Friese et al. | 136/86 R |
| 3,505,119 | 4/1970 | Gillespie | 136/86 R |

Primary Examiner—Winston A. Douglas
Assistant Examiner—H. A. Feeley
Attorney—Schiller & Pandiscio

[57] ABSTRACT

An electrochemical energy conversion device comprising a container, one or more electrochemical cells in said container adapted to produce a gas or to consume said gas according to the polarity of current passed by said one or more cells, polarity reversible means for passing current through said one or more cells, and pressure-responsive moveable mechanical means arranged for movement according to changes in the gas pressure in said container. Each cell comprises a gas producing and consuming electrode, a counter electrode, and an electrolyte contacted by both electrodes.

23 Claims, 8 Drawing Figures

PATENTED JUN 19 1973

ELECTROLYTE MATRIX

Pt/TFE

Pd-Pd BLACK

POLARITY SWITCHING

D.C. POWER SOURCE

INVENTOR
JOSE GINER

BY Schiller & Pandiscio

ATTORNEYS

INVENTOR
JOSE GINER

BY Schiller & Pandiscio

ATTORNEYS

INVENTOR
JOSE GINER
BY
Schiller & Pandiscio
ATTORNEYS

DEVICE FOR CONVERTING ELECTRICAL ENERGY TO MECHANICAL ENERGY

This invention relates to the art of energy conversion and more particularly to a device for converting electrical energy to mechanical energy.

The primary object of this invention is to provide a novel energy conversion device that utilizes reversible electrochemical action to convert electrical energy to mechanical energy.

A further object is to provide a novel energy conversion device that comprises an electrochemical cell or battery of cells adapted to generate a working gas pressure that is modulated according to electrical input and means for producing mechanical work from said working gas pressure.

A more specific object is to provide an energy converter of the character described that is compatible with electrochemical sources of electrical power such as batteries and fuel cells, has small volume and weight, and can be used in various applications, including but not limited to liquid or gas pumping devices, actuators, analog displacement converters, substitutes for relays, and gas flow regulators.

A further specific object is to provide a compact pump system for systole-diastole operation that comprises a pump driven by an electrochemical pressure generator.

The invention whereby the foregoing objects are attained comprises an electrochemical cell (or a battery of such cells) that essentially includes a gas producing and consuming electrode, a counter electrode, and an electrolyte contacted by both electrodes. Preferably the electrodes are spaced by a porous separator such as asbestos which serves as an electrolyte matrix to immobilize the electrolyte. The cell or battery of cells is mounted in a rigid container having a piston or equivalent element working against some differential pressure. When an appropriate current pulse is passed between the two electrodes, gas is generated at the gas producing electrode. The evolved gas raises the pressure in the container with the result that the piston moves against the differential pressure. When the current is reversed, gas in the container is consumed at the gas electrode. As a consequence the pressure in the container is lowered, thereby allowing the piston to be driven back by the differential pressure. Preferably the electrochemical cell is adapted to release and consume hydrogen. The invention also provides a new arrangement for converting electrical energy to mechanical pumping energy.

Other objects, features and advantages of the invention are disclosed or rendered obvious by the following detailed description which is to be considered together with the accompanying drawings wherein.

Figure 1:
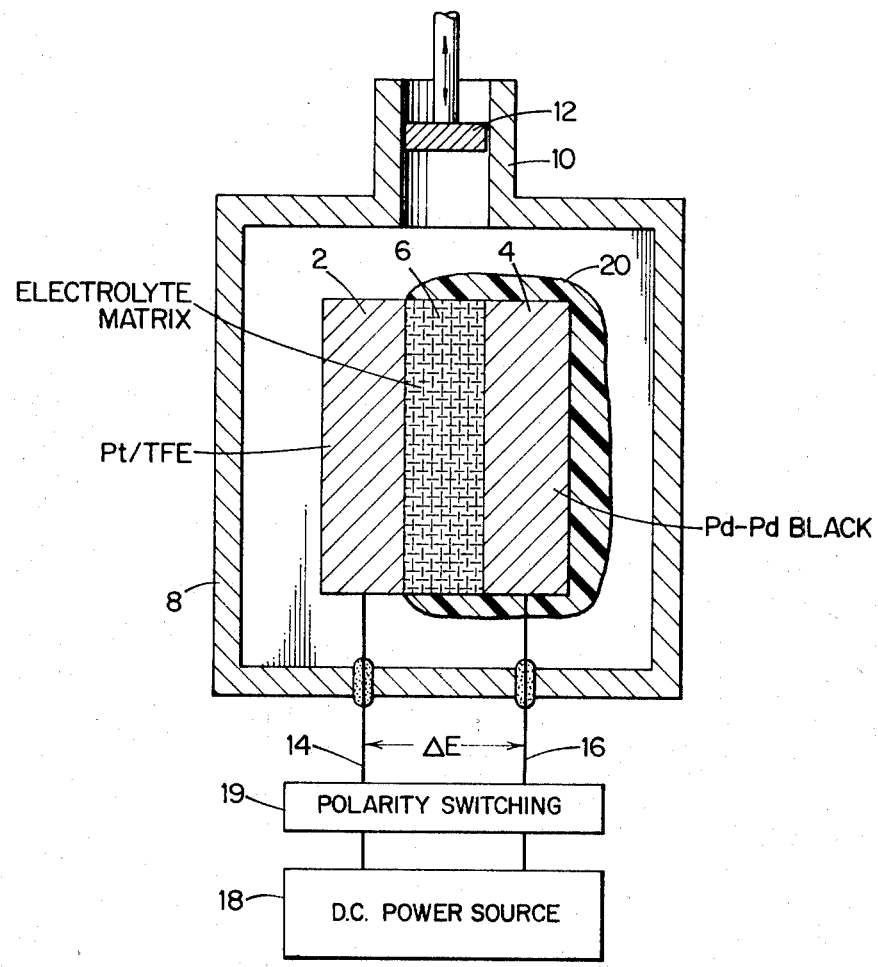
FIG. 1 is a schematic sectional view of a preferred type of electrochemical energy converter constructed in accordance with this invention.

Referring now to FIG. 1, the illustrated energy converting device comprises an electrochemical cell which releases and consumes hydrogen gas. The cell has two flat electrodes 2 and 4 spaced by a porous separator 6. The electrode 2 is a platinum-Teflon electrode like those used in conventional hydrogen-oxygen fuel cells. The electrode 4 is a palladium foil with a palladium-black surface which is saturated (or almost so) with hydrogen. The separator 6 consists of an electrolyte matrix in the form of a sheet of asbestos soaked with a selected electrolyte such as an aqueous potassium hydroxide or other alkaline hydroxide. The cell is mounted in a rigid container 8 fitted with a cylinder 10 in which is mounted a displaceable piston 12 that is acted on by the gas pressure in the container and works against a differential pressure exterior of the container. The electrodes 2 and 4 have electrical terminal leads 14 and 16 whereby current is applied to the cell from an appropriate d.c. source 18 with a polarity determined by a switching system 19. Preferably the back of the palladium electrode 4 is protected by a gas-impermeable coating as shown at 20 which prevents the palladium electrode from "seeing" the hydrogen gas in the container. By way of example, the coating 20 may be a metal such as nickel or an impermeable plastic film such as an epoxy resin. Initially the atmosphere in the container may be $H_2$ or $N_2$ or air water vapor or some other inert gas, or a partial vacuum. Preferably it is nitrogen.

Still referring to FIG. 1, when a current pulse is passed by the two electrodes so that electrode 2 is negative with respect to electrode 4, the following reaction occurs on the Pt-Teflon electrode:

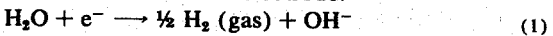
(1)

Simultaneously the following reaction occurs on the Pd electrode:

(2)

As a consequence of reaction (1), hydrogen gas is evolved and the gas pressure in container 8 can build to a level exceeding the differential pressure acting on the other side of piston 12, with the result that the piston can move outwardly in the cylinder 10. When the current is reversed so that electrode 4 is negative with respect to electrode 2, the reaction at the Pt-Teflon electrode 2 is reversed as follows:

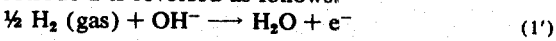
(1')

Simultaneously the following reverse reaction will occur at the Pd electrode 4:

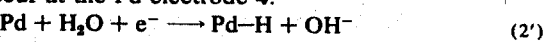
(2')

As a consequence of reaction (1'), hydrogen is consumed at electrode 2, thereby reducing the gas pressure in the container and allowing the piston to be driven back into the cylinder. Obviously the distance through which the piston will travel as a result of gas evolution or gas consumption depends on the net pressure difference across the piston.

In the absence of polarization, the Pd electrode will tend to remain at a constant potential (versus an imaginary reference electrode), i.e., due to the low solubility and slow diffusion of hydrogen in the electrolyte surrounding the Pd electrode, the latter will not "see" the change of hydrogen partial pressure in the atmosphere.

Assuming that the potential of the Pd electrode is 0.0 volts (versus a hydrogen reference electrode) at one atmosphere, the hydrogen partial pressure at the potential between the two electrodes of FIG. 1 is determined by the expression:

$$\Delta E + 2.303\ (RT/2F)\ \log P \qquad (a)$$

where $\Delta E$ is the potential between the electrodes, $R$ is the molar gas constant, $T$ is the absolute temperature, $F$ is the Faraday quantity of electricity in coulombs, and $P$ is the gas pressure. Thus the pressure in the container is determined by the voltage according to the equation (a) above, while the amount of gas generated is directly proportional to current according to Faraday's law of electrolysis. The rate of piston displacement is determined by the net pressure difference across the piston while the pressure that the piston has to oppose is determined by the impedance of the system external of the container to which the piston is connected. The amount of gas produced at a given pressure for a single cell as shown in FIG. 1 depends on the total current passed between the electrodes according to Faraday's law as mentioned above. The current density may approach the levels that have been reached with fuel cells, i.e., as much as 3,000 mA/cm$^2$, but it is preferable (for efficiency and to avoid generation of excessive heat which will tend to cause deterioration of the electrodes) that the current density at each electrode not exceed about 200 mA/cm$^2$. Accordingly, it is advisable to have a large electrode surface. It also is advisable to stack several cells in series in order to increase the voltage that is to be applied to the energy converter to practical values. The requisite current and the voltage between the two electrodes is determined by the sum of the hydraulic impedances of the converter and the output unit, e.g., pump, driven by the converter and the electrical impedance of the circuit. By fixing the temperature and impedance of the system, gas pressure and volume cycles may be determined by a current - time curve (voltage-time curve) and vice versa. Hence by appropriately shaping a current cycle it is possible to obtain a gas pressure cycle and a gas volume cycle.

Figure 3:
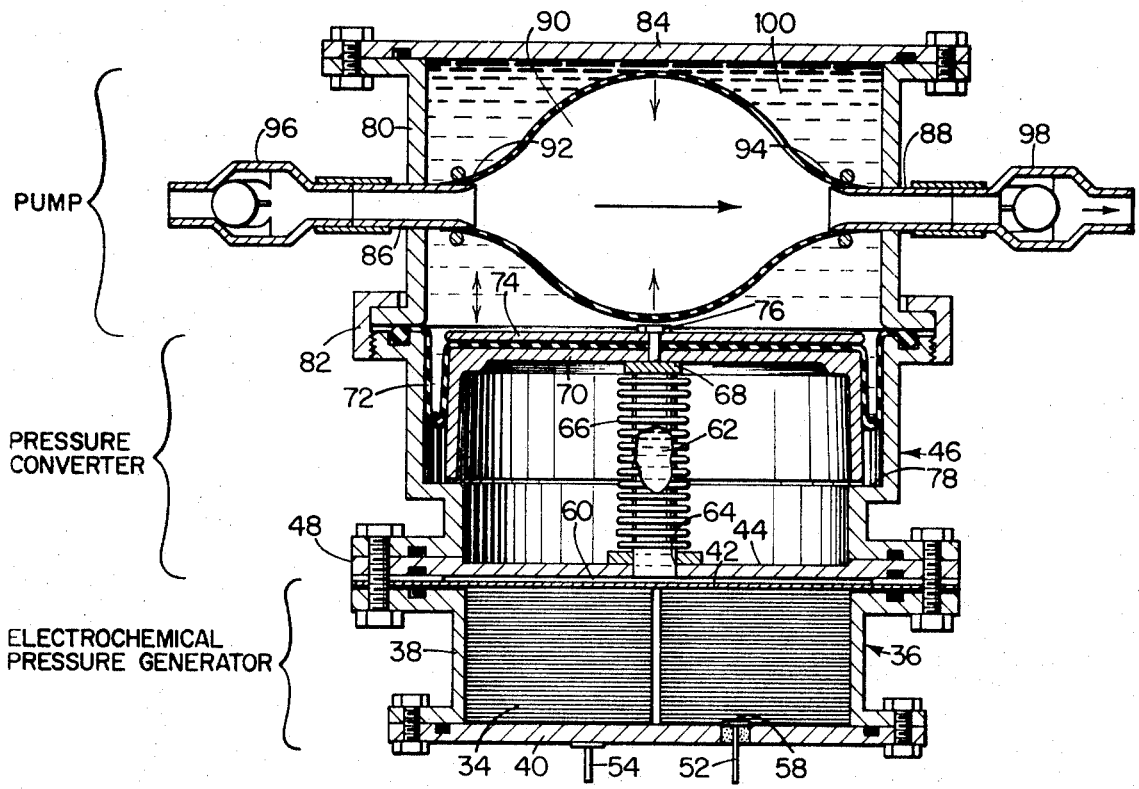
FIG. 3 is a sectional view in elevation of a novel blood pump incorporating an electrochemical energy converter made in accordance with this invention.

Regarding the efficiency, it increases with increases in the ratio of the theoretical cell voltage to the voltage losses due to ohmic IR drop, concentration polarization, etc. which are proportional to the current. Therefore $\Delta E$ should be as high as possible. This means, according to equation (a) above, that the generation of a relatively large hydrogen pressure is preferable. However, there are certain practical limitations on the magnitude of hydrogen pressure. One is the problem of containing the gas pressure in the energy converter; another is the difficulty in effecting a reduction in pressure when a low working pressure is required, e.g., when the converter is used to operate a pump which is to pump a fluid against a low pressure differential. The device shown in FIG. 3 illustrates how it is possible to have the converter working at a relatively high gas pressure for high efficiency and to perform afterwards a reduction from a high gas pressure to a low pump working pressure. At this point it suffices to point out that the reduction in pressure can be performed in a variety of ways, e.g. by coupling two pistons or diaphragms of different effective areas or by means of a suitable lever mechanism.

Of course the cell may comprise other electrodes and electrolytes and may be adapted to produce and consume some other gas. In one variant to the converter shown in FIG. 1, the gas producing Pt-Teflon electrode is the same but the palladium-hydrogen counter electrode is replaced by another electrode which does not consume or produce gas and has a pH dependence on potential similar to that of the Pt-Teflon electrode, i.e., an H$^+$ ion is produced or an OH$^-$ ion consumed with each electron. Thus the electrode 4 may be replaced by a Cd/CdO electrode, in which case the reactions (2) and (2') are replaced by the following reactions:

$$Cd + 2OH^- \longrightarrow CdO + H_2O + 2e^- \qquad (3)$$
$$CdO + H_2O + 2e^- \longrightarrow Cd + 2OH^- \qquad (3')$$

Still other reversible metal/metal oxide electrodes may be substituted for the palladium hydrogen counter electrode, e.g., an Ag/AgO electrode, in which case the reactions (2) and (2') are replaced by the following reactions:

$$Ag + 2OH^- \longrightarrow AgO + H_2O + 2e^+ \qquad (4)$$
$$AgO + H_2O + 2e^- \longrightarrow Ag + 2OH^- \qquad (4')$$

In still another variant of the invention which produces and consumes hydrogen gas, the KOH electrolyte is substituted by aqueous HCl and the Pd counter electrode is substituted by an Ag/AgCl electrode, with the result that the following reversible reactions occur at the gas producing electrode and the counter electrode respectively:

$$2H^+ + 2e^- \rightleftharpoons H_2\ (gas) \qquad (5)$$
$$2\ Ag + 2\ Cl^- \rightleftharpoons 2\ AgCl + 2e^- \qquad (6)$$

The invention also may be modified so as to generate a gas other than hydrogen, e.g. chlorine or oxygen. Thus using the same Pt-Teflon and Pd-H electrodes and substituting aqueous HCl as the electrolyte in separator 6, the following reactions will occur at the gas and counter electrodes respectively:

$$2\ Cl^- \rightleftharpoons Cl_2\ (gas) + 2e^- \qquad (7)$$
$$2H^+ + Pd + 2e^- \rightleftharpoons 2\ Pd-H \qquad (8)$$

The same result, i.e., evolution and consumption of chlorine gas can be achieved by substituting the Pd electrode with an Ag/AgCl electrode and using as the electrolyte an aqueous solution of NaCl and HCl which is acidic. In such a case the reaction (7) will occur at the Pt-Teflon and the reaction at the Ag/AgCl electrode is as follows:

$$2\ AgCl + 2e^- \rightleftharpoons 2\ Ag + 2\ Cl^- \qquad (9)$$

Still further variants which produce and consume chlorine gas involve using the same Pt-Teflon electrode and the same HCl-NaCl electrolyte but substituting a counter electrode of Hg/Hg$_2$Cl$_2$ or Hg-Na, in which case reaction (7) will occur at the gas electrode and the following reactions will occur at the counter electrode:

$$Hg_2Cl_2 + 2e^- \rightleftharpoons 2\ Hg + 2\ Cl^- \qquad (10)$$
$$2Hg + 2Na^+ + 2e^- \rightleftharpoons 2\ Na\ Hg \qquad (11)$$

An example of a suitable oxygen reaction is the following:

$$O_2 + 2H_2O + 4e^- \rightleftharpoons 4OH^- \qquad (12)$$

When using an oxygen electrode, the counter electrode is of the same type as when the gas is hydrogen.

Still other variants are possible. Thus the Pt-Teflon electrode may be replaced by some other fuel cell electrode known to persons skilled in the art that (1) is inert to the electrolyte, (2) has a pore system which enables it to absorb the gas but which will prevent the electrode from being flooded with electrolyte, (3) has an adequate surface area, and (4) is catalytic with respect to the electrochemical reaction that is involved. More particularly the gas producing electrode may be one or more of the following types well known in the art of fuel cells — an electrode comprising a metal catalyst or carbon in particle form bonded by Teflon or some other hydrophobic binder, a sintered metal catalyst electrode, a porous carbon electrode, and a porous carbon electrode plated or impregnated with a selected metal catalyst.

Platinum, palladium nickel, silver, ruthium, rhodium, and carbon are among the catalysts that may be used. The hydrophobic binder may be a plastic such as polyethylene, polypropylene, Teflon, Elvax, polystyrene, as well as other materials such as paraffin known to persons skilled in the art. By way of example, the gas diffusion electrode may consist of a sintered nickel plaque or such plaque coated with platinum or palladium-platinum, porous baked carbon wetproofed with paraffin or ceresin wax or other suitable agent, porous baked carbon impregnated with one of the metal catalysts noted above, and Teflon-bonded platinum black or palladium black. Further details as to the nature and method of fabricating such electrodes are provided in the NASA publication "Fuel Cells — A Review of Government-Sponsored Research, 1950–1964," Library of Congress, Cat. No. 66–60090, pp. 59–80 (1967).

The matrix for the electrolyte may consist of a material other than asbestos. Suitable alternative matrix materials are MgO, zirconia, aluminum silicate, etc. which are formed by cold-pressing or casting mixtures thereof with a suitable binder and then sintered and fired to decompose and remove the binder (see Fuel Cells, ibid, pp. 86–89, for details on matrix formation). The matrix also may be on organic compound, e.g., porous polyethylene, cellophane, sulfonated polyfluorocarbons, ion-exchange resins, etc.

The initial condition of the palladium electrode wherein hydrogen is absorbed therein may be achieved in several ways. The preferred way is to have the cell or cells in a container as in FIG. 1 but with the container vented to the atmosphere and then to pass current so that hydrogen is produced cathodically at the palladium electrode and oxygen is evolved anodically at the gas producing electrode, e.g., the platinum-Teflon electrode. The oxygen is vented to the atmosphere. Once hydrogen is absorbed in the palladium, the current is stopped and the pressure container is sealed.

Figure 2:
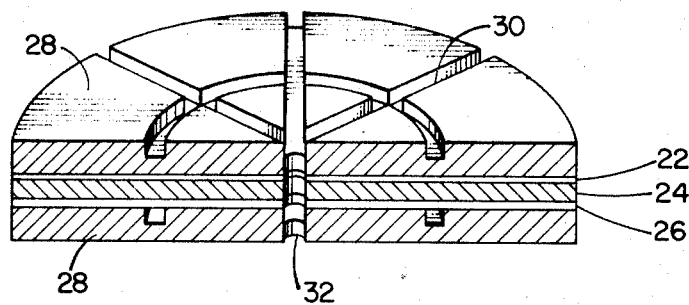
FIG. 2 is a sectional view in perspective of a single electrochemical cell.

As indicated above, it is advisable to stack several cells in series in order to increase the voltage that is to be applied to the converter to a practical value. FIG. 2 shows a preferred form of cell unit that can be readily stacked and connected in series. The cell unit of FIG. 2 is designed to generate and consume hydrogen gas and has four functional components. One component is a palladium-palladium black electrode 22 in which hydrogen can be absorbed. This electrode has a thickness of about 2 mils and an electrode area of selected size. The second functional component is an electrolyte separator 24 consisting of an asbestos matrix which is soaked with and serves to immobilize an electrolyte. The latter is an aqueous solution of KOH (about 25–35 percent concentration). The asbestos matrix has the same area as the palladium-palladium black electrode 22 and has a thickness of about 5-10 mils. The third component is a Teflon-bonded porous platinum electrode 26 for hydrogen pressure cycling. This electrode has the same area as electrode 22 and by way of example consists of 75 percent platinum and 25 percent Teflon by weight with a platinum loading of 20 mg/cm$^2$. The fourth functional component consists of two conductive metal collector plates 28, one for each of the electrodes 22 and 26. The collector plates may be made of nickel, copper, steel, gold-plated aluminum, or other conductive metals. The essential requirement of the collector plates is that they be highly resistant to corrosion by the electrolyte or under the reaction conditions. The collector plates serve to conduct current to the two electrodes and also to physically support the two electrodes. The collector plates also provide series connection between two or more stacked cells, facilitate movement of hydrogen to and from the Pt-Teflon electrodes, and shield the palladium electrodes from seeing gaseous hydrogen. In this particular preferred cell unit, each collector plate is about 20 mils thick and has the same area as the electrodes. Additionally, each collector plate is provided with one or more radially and/or circumferentially-extending grooves 30 which serve as gas distributing channels. A center hole 32 through each of the components 22, 24, 26 and 28 is provided to facilitate transmittal of hydrogen pressure to the pressure-responsive displaceable member, e.g. a piston as in FIG. 1, that forms part of the energy converter. In this particular cell unit, the grooves 30 are preferably 10 mils deep and 10 mils wide, and the hole 32 is preferably about 60 mils in diameter. It is preferred but not necessary that the cells be circular as shown. A cell as above described is capable of operating at a current density of 200 mA/cm$^2$ with a total current input of about 7 amps.

It is to be noted that no gas distribution space is requred at the palladium electrode in the cell unit of FIG. 2 since there is no gaseous phase present at that side of the cell. Furthermore, the electrolyte matrix does not need to provide an absolute gas barrier, as it typically does in fuel cell or electrolysis cell applications, since only hydrogen is present throughout the cell. Because no gas distribution space is required at the palladium electrode, the latter can be directly bonded to the adjacent side of the collector plate. Accordingly, it is preferred that the palladium be plated directly onto the back side of the collector plate, thereby reducing cell thickness. It is to be noted that when several cells are stacked together, the collector plates are bi-polar (Pd electrode on one side, Pt/Teflon electrode on the other side) except for the first and last plates which serve as external electrical contacts to the cell stack. Thus, it is preferred that the electrodes and collector plates (except for the first and last collector plates) be made as integral bi-polar units, with each collector plate having a plating of Pd on one side and a Pt/Teflon composition bonded to the opposite side. Such integrated bi-polar structures eliminate the need for gas permeable coating 20 and provide a substantial decrease in cell stack thickness (e.g. as much as 20 percent per cell) over a cell stack where each functional component is a separately formed member.

FIG. 3 shows a specific application of the invention which is a pump system designed to pump blood. The illustrated pump system comprises a stack 34 of series-connected cell units of the type shown in FIG. 2. The cell stack 34 is mounted in a container 36 comprising a cylindrical housing 38 that is hermetically sealed at one end by a removable end plate 40. The other end of housing 38 is hermetically sealed off by a flexible metal diaphragm 42 whose outer edge is clamped between housing 38 and the end plate 44 of a second cylindrical housing 46. The two housings 38 and 46, diaphragm 42 and end plate 44 are secured together by a bolted end flange arrangement as shown at 48. The diaphragm is made of suitable resilient, electrically conductive, hydrogen-impermeable metal, e.g., nickel, and when not deflected upwardly by gas pressure lies flat against the topmost collector plate of the cell stack. Two electrical leads 52 and 54 are mounted in ceramic or glass insulating feedthroughs 56 in end plate 40. The inner end of terminal lead 52 terminates in a conductive land 58 that makes direct electrical contact with the bottommost collector plate of the cell stack 34, while the inner end of terminal lead 54 is connected by means of an insulated wire (not shown) within housing 36 to the topmost collector plate in the cell stack. The inner surface of housing 36 has an electrical insulating coating (not shown) so as to prevent the several collector plates from being short-circuited when an electrical potential is applied across terminal leads 52 and 54.

The end plate 44 of housing 46 is spaced from diaphragm 42 except at its outer margin so as to leave a space 60 to permit displacement of the diaphragm by gas generated by the cell stack and also to accomodate a hydraulic fluid 62 which exerts a back pressure on the diaphragm. For the latter purpose the end plate has a port 64 through which hydraulic fluid pressure can be transmitted from the interior of a metal bellows 66. One end of bellows 66 is secured to end plate 44; the other end of bellows 66 is closed off by and secured to an end disc 68 that is attached to a piston assembly attached to a rolling diaphragm. The piston assembly comprises a hollow piston 70 engaging one side of a rolling diaphragm 72 and a clamping plate 74 that engages the opposite side of the same diaphragm. Piston 70 and clamping plate 74 are clamped against the diaphragm 72 by means of a cap screw 76 that is screwed into disc 68. The housing 46 has an internal shoulder 78 that functions as a stop to limit downward movement of piston 70. The outer margin of rolling diaphragm 72 is captivated between two flanges formed on the upper end of housing 46 and the lower end of a pump housing 80. The two flanges are clamped tight against the diaphragm in a fluid-tight seal by a threaded coupling 82.

The other end of pump housing 80 is hermetically closed off by a removeable end plate 84. Mounted in the wall of pump housing 80 in diametrically opposed relation are two metal sleeves 86 and 88.

Disposed in pump housing 80 is a flexible bladder 90 made of rubber or other suitable elastomer. Bladder 90 has two tubular extensions 92 and 94 which are secured to and communicate with sleeves 86 and 88 respectively. The outer ends of sleeves 86 and 88 are connected to like ball check valves 96 and 98 which are adapted to be connected into a blood circulating system, e.g., valve 96 is connected to the left ventricle and valve 98 is connected to the aorta of a human blood circulating system. Valves 96 and 98 are reversed so that the former will allow blood to flow only into bladder 90 and the latter will allow blood to flow only out of bladder 90. The pump housing is filled with a standard saline solution 100.

Operation of the system of FIG. 3 is described hereinafter in connection with the description of a specific embodiment thereof designed to pump blood at a rate of about 50 cc/sec. against a pressure of 120 mm. of mercury at 37°C. In this specific embodiment the bladder has a capacity of 80–100 cc. The rolling diaphragm has an effective area of 50 cm² (7.75 in.²) and displaces 50 cc. of saline solution at 120 mm. Hg (2.32 psi) when it travels 1 cm. (0.394 in.). The force required is 18 lbs. and the work required is 18 lbs. through a distance of 0.394 in or 7.09 in-lbs. The required linear movement of diaphragm 72 is supplied by action of metal bellows 66. The latter moves a distance of 0.394 under a net pressure, $\Delta P$, of 132.3 psi. The effective area of the bellows applied to the rolling diaphragm is 0.136 in.². This action provides the required working force of 18 lbs. (132.3 psi $\times$ 0.136 in.²) through a linear extension of 0.394 in. The dimensions of bellows 66 are 0.513 inch in diameter by a wall thickness of 0.0022 in. and a length of 1.379 in. The bellows has a spring rate of 3.1 lbs/in. which imposes the requirement of an additional 9 psi to the bellows which is calculated by dividing the product of the bellows' spring rate and bellows' linear extension by its effective area. Hence the total pressure required to the bellows is 141.3 psi and the resultant volume displacement is 0.394 in. $\times$ 0.136 in.² = 0.0535 in.³ (0.877 in.³). This required volume displacement in the bellows is accomplished by the deflection of the metal diaphragm 42. The volume displacement achieved by defelction of the diaphragm 42 can be approximated from the empirical formula $V = \frac{1}{2} YA$ where Y is displacement and A is the diaphragm's effective area. In the specific embodiment the nickel diaphragm has an effective area of 7.07 in.² (about 1.5 in. radius). Hence the diaphragm must deflect 0.016 in. The action of the diaphragm 44 corresponds to that of a piston of 7.07 in.² moving through a distance of 0.0076 in. The force required is 7.07 in.² $\times$ 141.3 psi = 1,006 lbs.

In addition the resistance of diaphragm 44 itself must be overcome. In this particular embodiment the nickel diaphragm has a thickness of 0.010 in. and the force required for a deflection height of 0.016 in. is about 6.03 lbs. This requires an additional pressure of 0.85 psi to the diaphragm. Therefore the total pressure that must be supplied by the electrochemical pressure generator is about 142.2 psi. The work required by the pump is 18 lbs. $\times$ 0.394 in. = 7.1 in/lbs. (about 0.80 joules), while the work required from the generator is 1,012 lbs. $\times$ 0.0076 in. = 7.7 in./lbs. (about 0.87 joules). The additional work (0.07 joules) represents the work necessary to operate the bellows and the metal diaphragm.

The required pressure differential of 142.2 psi is generated by passing current through the stack of series connected circular cells of the type shown in FIG. 2 so that hydrogen is evolved at the PT/Teflon electrodes in the cathodic mode. The cells are constructed as described above in connection with FIG. 2 and total 25 in number. The center hole 32 through the components 22, 24, 26 and 28 of each cell is about 60 mils in diameter and each cell has an outside diameter such that each electrode has a surface area of about 35 cm². The current required to generate 0.0535 in.$^3$ (0.877 cm$^3$) of hydrogen at 142.2 psi (9.67 atmospheres) and 37°C in. 0.5 seconds is about 5.68 amps per cell. However, an additional quantity of hydrogen is required to raise the pressure in the dead space in the generator represented by the central holes and the grooves in the collector plates. In this particular embodiment of the invention the dead space is about 0.220 cm$^3$ and the additional current required to fill the dead space with hydrogen at the desired pressure is about 1.29 amps. Thus the total current required to be applied to the electrochemical pressure generator is 6.97 amp. The voltage reqired to be applied across the stack of cells is determined by the following expression.

$$E = (RT/2F)\ 2.303\ \log P_1/P_o$$

where $P_1$ = is the pressure generated by the pressure generator and equals the sum of the pressure differential plus the pressure against which the pump is operating (i.e. 9.67 atmoshpere plus 1 atmosphere), $P_o$ is the pressure against which the pump is operating, $T$ is 37°C and $R$ and $F$ represent the gas constant and the current in Faradays. In this case the voltage applied across the 25 cells will oscillate between 0 and 0.8 volts. Obviously the magnitude of the required voltage will depend upon the required pressure differential which will vary according to the particular system being operated. A pressure in the range of 10 atmospheres as required by the foregoing system offers the advantage of a sizeable applied voltage and thus better efficiency because of a relatively high rate of cell voltage to voltage losses such as ohmic IR drop.

Figure 4:
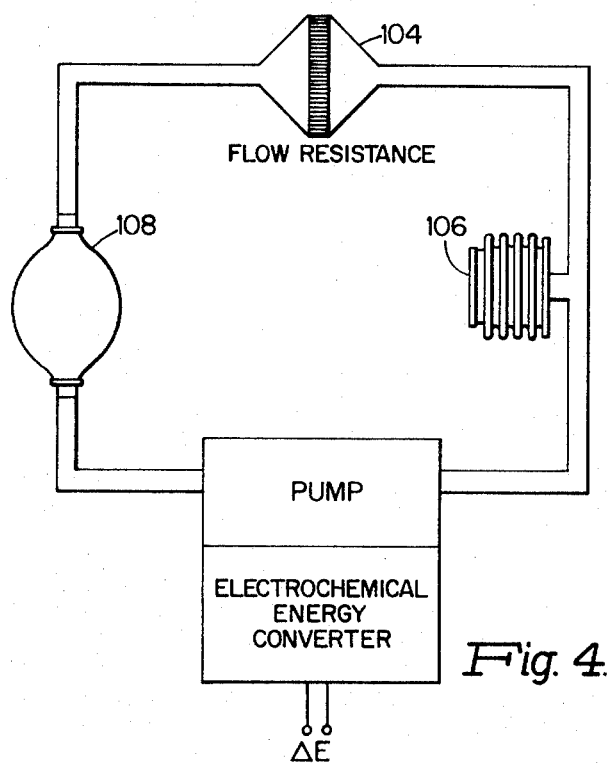
FIG. 4 is a schematic diagram of a blood circulating system with the device of FIG. 3.

Operation of the foregoing specific-embodiment of FIG. 3 will now be described in connection with FIG. 4 which shows the pump connected in a blood circulating system. The blood coming out of the pump flows through a resistance 104 representing the capillary system. In front of resistance 104 is a pressure reservoir 106 which represents the pressure storing capacity of the arterial vessels. On the return side of the resistance is a volume storage chamber 108 which represents the atrium and allows the pump to fill at atmospheric pressure. It is to be noted that work has to be delivered by the pump only during systole (during diastole the pump is filled passively without work at atmospheric pressure). The current pulse for gas generation may have the same amplitude and duration as for gas consumption. However, in principle it is only necessary that the electric charge during systole be equal to the electric charge during diastole. Accordingly the current, time and shape of the current pulse can be varied as long as the product of current and time is a constant for both phases of operation.

Figure 5:
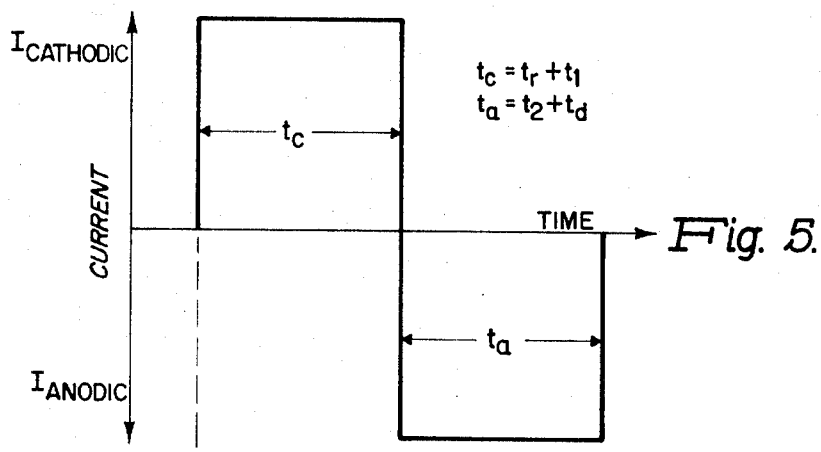
FIG. 5 illustrates the current cycle of the device of FIG. 3.

FIG. 5 shows the current cycle for the electrochemical pressure generator. The voltage applied across the electrodes is such that 6.97 amps of current flow first in one direction through the cell stack for a period $t_c$ and then in the opposite direction for a like period $t_a$. During the time $t_c$ the platinum-Teflon electrodes are negative (i.e. cathodic) and hydrogen gas is evolved. During the time $t_a$, the same electrodes are positive (i.e. anodic) and hydrogen gas is consumed.

Figure 6:
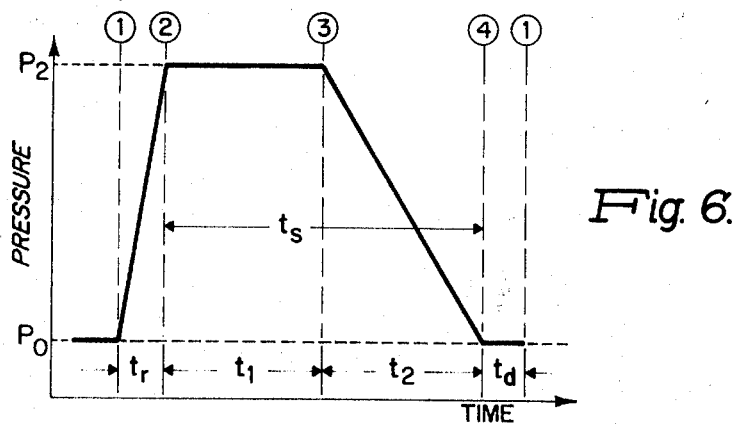
FIG. 6 illustrates the corresponding pressure cycle of the same device.

FIG. 6 shows the corresponding pressure-time curve. $P_0$ is the atmospheric pressure and $P_s$ is the maximum aortic pressure. At point (1) the pressure in the pump is one atmosphere. During the time $t_r$ the residual volume in the container 36 is filled until at point (2) the maximum systolic pressure is reached. During time $t_1$, blood is expelled with the pressure remaining steady up to point (3), and then ceases. During the time period $t_2$, the pressure in the pump decreases linearly with time to point (4). The time period $t_1 + t_2$ can be considered as the duration of systele ($t_s$). At point (4) the pump has achieved atmospheric pressure and it fills during a time $t_d$ which represents the diastole phase. A similar curve can be drawn for the pressure inside the container 36 of the electrochemical pressure generator.

Figure 7:
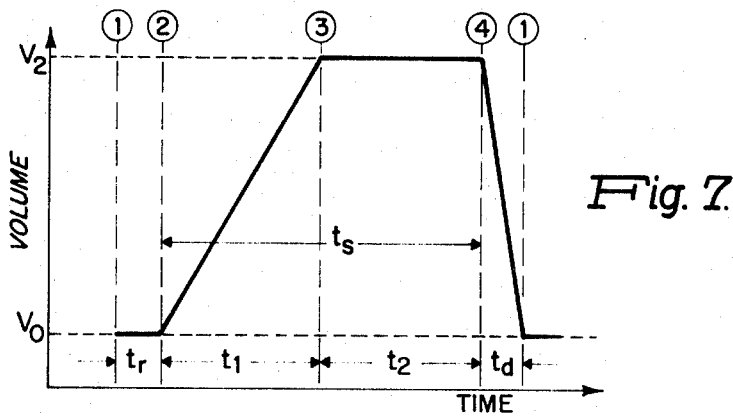
FIG. 7 shows the volume of blood delivered versus time.
Figure 8:
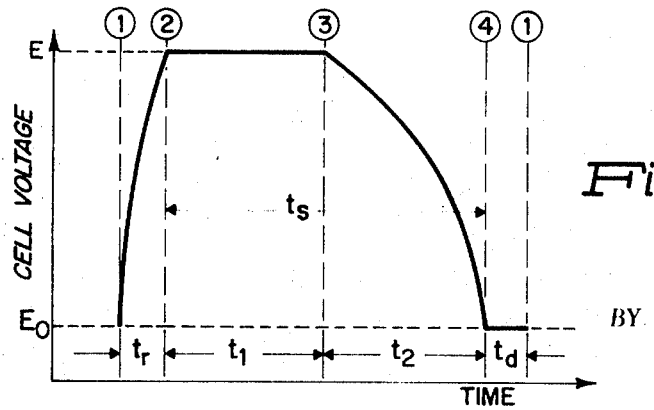
FIG. 8 shows the change in cell voltage with time.

FIGS. 7 and 8 show the volume of blood delivered versus time and the change of cell voltage with time respectively. All the time designations are the same as those of FIG. 6. The curvature in the $t_r$ - phase (time to build up pressure in the residual space) and the curvature during the $t_2$ - phase (time required to decrease the pressure in the pump) are due to the logarithmic relationship between potential and pressure expressed in equation (a) above. For the specific embodiment of the system of FIG. 3 described above, the voltage varies from 0 to 0.8 volts.

It is believed to be obvious that the system of FIG. 3 can be used to pump fluids other than blood. Furthermore when handling other fluids the saline solution can be replaced by some other suitable liquid or, if desired, the bladder and saline solution may be omitted entirely and the rolling diaphragm piston assembly used directly as the pumping member. It also is contemplated that electrochemical pressure generators constructed in accordance with this invention may be used in other applications where it is desired to convert electrical energy to mechanical energy. Thus the moveable piston 12 of FIG. 1 or the rolling diaphragm piston assembly of the embodiment of FIG. 3 could be used to operate a switch or adjust a gas flow valve or move an analog mechanical displacement member according to the electrical input applied to the electrochemical cell or stack of cells. An additional advantage of the invention is that the power signals required to operate the electrochemical pressure generator are pulses of relatively high dc current at low or modest potentials and hence the generator can be powered by sources such as batteries or fuel cells with current reversal effected by various switching devices well known to persons skilled in the art.

Of course, the invention is not limited to the specific design and arrangement described above. Thus the size and shape of cells embodying the invention may be varied according to the operational requirements of the system in which they are employed. Similarly the thickness and composition of the component parts of the cells also may be different than as described above in connection with FIG. 2. For example, the electrolyte may comprise a suitable material other than KOH or the KOH concentration may be greater or less than 25–35 percent by weight, while the thickness of the electrodes, electrolyte separator and collector plates may be greater or less than as previously described. Further by way of example, the number and disposition of the cells stacked together in a device of FIG. 3, as well as the type of device in which the cells are employed, also may be varied. As to the embodiment of FIG. 3, it is believed obvious that its construction also may be varied (e.g., the several parts of the housing may be made and connected other than as described)

What is claimed is:

1. A device for converting electrical energy to mechanical energy comprising a housing containing at least one reversible electrochemical cell adapted to release a gas when passing a current in a first direction and to consume said gas when passing a current in the opposite direction, said housing being sealed so as to prevent escape of gas therefrom and also including displaceable mechanical means adapted to move in a first direction in response to a gas pressure buildup in said housing as gas is released by said at least one cell and to move in a second opposite direction in response to a gas pressure drop in said housing as gas is consumed by said at least one cell, means exterior of said housing and responsive to said displaceable means for producing mechanical work exterior of said device in accordance with movement of said displaceable means, a d.c. power supply exterior of said housing, and means exterior of said housing and connected between said power supply and said at least one cell for switching the output of said power supply with respect to said at least one cell so as to control the direction of the current passed by said at least one cell.

2. A device according to claim 1 wherein said at least one cell comprises an electrolyte and two electrodes contacting said electrolyte, at least one of said electrodes being adapted to release and consume said gas according to the polarity of current passed between said electrodes.

3. A device according to claim 1 wherein said gas is hydrogen or chlorine or oxygen.

4. A device according to claim 1 wherein said displaceable means comprises a piston.

5. A device according to claim 1 wherein said means for producing mechanical work, comprises a fluid handling pump, and means connecting said pump and said displaceable means so that said pump is operated by movement of said displaceable means.

6. A device according to claim 5 wherein said pump comprises a bladder surrounded by a fluid for applying pressure to said bladder, and said connecting means comprises a coupling for translating movement of said displaceable means into changes in the pressure of said fluid so that said bladder will contract or expand according to said changes in fluid pressure.

7. An energy converter comprising an electrochemical pressure generator that includes a closed pressure housing with displaceable means mounted for movement according to the differential between the pressure in said housing and the pressure exterior of said housing, a pair of terminals, a plurality of reversible electrochemical cells mounted as a stack within said housing and connected in series between said terminals, each of said cells having an electrolyte and first and second electrodes contacting said electrolyte with said first electrode adapted to (a) release a gas to pressurize said housing when a current passes in a first direction between said electrodes and (b) consume said gas to reduce the pressure in said housing when a currnet passes in a second opposite direction between said electrodes, means for selectively applying a voltage across said terminals so as to control the direction and magnitude of the current passed by said cells, and means exterior of said housing for producing mechanical work in accordance with movement of said displaceable means.

8. An energy converter according to claim 7 wherein said first electrode is a porous fuel cell electrode.

9. An energy converter according to claim 7 wherein said first electrode comprises platinum.

10. An energy converter according to claim 8 wherein said electrolyte is an alkaline hydroxide, said second electrode is a palladium electrode, and said gas is hydrogen.

11. An energy converter according to claim 8 wherein said electrolyte comprises chloride ions and said second electrode is $Ag/AgCl_2$ or Pd or $Hg/Hg_2Cl_2$ or Hg — Na, whereby the gas is chlorine.

12. An energy converter according to claim 8 wherein said first electrode consists of a catalyst and a hydrophobic binder.

13. An energy converter according to claim 12 wherein said binder isTeflon.

14. An energy converter according to claim 12 wherein said catalyst is platinum.

15. An energy converter according to claim 8 wherein said electrolyte comprises hydroxyl ions and said second electrode is a metal/metal oxide.

16. An energy converter according to claim 15 wherein said second electrode is Ag/AgO or Cd/CdO.

17. An energy converter according to claim 7 wherein said electrodes are flat members and each cell comprises an electrode separator including said electrolyte and a matrix for said electrolyte, and first and second current collector plates engaging said first and second electrodes respectively, said terminal leads being connected to the first and last collector plates in said stack of cells.

18. An energy converter according to claim 17 wherein said collector plates have grooves confronting said first electrodes for movement of said gas to and from said first electrodes.

19. An energy converter according to claim 5 wherein said displaceable means is a flexible diaphragm.

20. An energy converter according to claim 19 wherein said means for producing mechanical work comprises a moveable member and hydraulic means for moving said member in accordance with movement of said diaphragm.

21. An energy converter according to claim 7 wherein said voltage applying means comprises a source of electrical potential exterior of said housing and means connecting said source and said terminals for reversing the polarity of said potential with respect to said cells.

22. An energy converter according to claim 17 wherein said first electrode comprises platinum and is porous and said second electrode comprises palladium, and further wherein each of said first and second electrodes is integral with a current collector plate.

23. A device for converting electrical energy to mechanical energy comprising a closed housing, at least one reversible electrochemical cell within said housing adapted to release a gas into said housing when passing a current in a first direction and to consume said gas when passing a current in a second opposite direction, displaceable means exterior of said cell, said displaceable means being mounted for (a) movement in a first direction in response to a gas pressure buildup in said housing as gas is released by said at least one cell and (b) movement in a second opposite direction in response to a gas pressure drop in said housing as gas is consumed by said at least one cell, means outside of said housing for producing mechanical work exterior of said device in accordance with and in response to movement of said displaceable means, and means for controlling the direction and magnitude of the current passed by said at least one cell.

* * * * *